(12) United States Patent
Lu et al.

(10) Patent No.: US 9,591,287 B2
(45) Date of Patent: Mar. 7, 2017

(54) LENS MODULE APPLIED TO CAMERA

(71) Applicant: HIMAX TECHNOLOGIES LIMITED, Tainan (TW)

(72) Inventors: Yin-Dong Lu, Tainan (TW); Han-Yi Kuo, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 82 days.

(21) Appl. No.: 14/601,607

(22) Filed: Jan. 21, 2015

(65) Prior Publication Data

US 2016/0212407 A1 Jul. 21, 2016

(51) Int. Cl.
| | | |
|---|---|---|
| *H04N 3/14* | (2006.01) | |
| *H04N 5/225* | (2006.01) | |
| *H04N 13/02* | (2006.01) | |
| *G02B 13/00* | (2006.01) | |

(52) U.S. Cl.
CPC ....... *H04N 13/0239* (2013.01); *G02B 13/006* (2013.01); *G02B 13/0025* (2013.01); *G02B 13/0085* (2013.01)

(58) Field of Classification Search
CPC .............. H04N 5/2251; H04N 5/2257; H04N 2213/001; G03B 35/08
See application file for complete search history.

(56) References Cited

U.S. PATENT DOCUMENTS

| | | | |
|---|---|---|---|
| 2009/0058993 A1* | 3/2009 | Lee ................ | H04N 13/0239 348/49 |
| 2011/0228142 A1 | 9/2011 | Brueckner et al. | |
| 2012/0181646 A1* | 7/2012 | Han ................ | H04N 5/2251 257/432 |
| 2014/0111875 A1 | 4/2014 | Herard | |
| 2015/0109468 A1* | 4/2015 | Laroia ............ | G02B 13/02 348/208.6 |

FOREIGN PATENT DOCUMENTS

| | | |
|---|---|---|
| EP | 2533008 A1 | 12/2012 |
| WO | 2009151903 A2 | 12/2009 |
| WO | 2011156764 A1 | 12/2011 |

* cited by examiner

*Primary Examiner* — Jason Flohre
*Assistant Examiner* — Selam Gebriel
(74) *Attorney, Agent, or Firm* — Locke Lord LLP; Tim Tingkang Xia, Esq.

(57) ABSTRACT

A lens module includes a first wafer level lens group, a second wafer level lens group, a first sensor, and a second sensor. The first wafer level lens group has a first optical axis. The second wafer level lens group has a second optical axis. The first optical axis is parallel with the second optical axis, and the first wafer level lens group and the second wafer level lens group are integrally formed. The first sensor is disposed corresponding to the first wafer level lens group, and the first sensor is disposed on the first optical axis. The second sensor is disposed corresponding to the second wafer level lens group, and the second sensor is disposed on the second optical axis.

7 Claims, 3 Drawing Sheets

LENS MODULE APPLIED TO CAMERA

BACKGROUND

Field of Invention

The present invention relates to a lens module.

Description of Related Art

Recently, many scene-detection systems attempt to extract depth from a scene by mimicking the human stereo perception system to produce two or more images. The scene-detection systems are applicable to cameras, smart phones, etc. In order for these scene-detection systems to operate properly, the scene-detection systems can be designed to receive two images from two separate but interconnected aspects, and then the images can be analyzed to obtain the depth.

In the assembly of the scene-detection systems, to reach the above purposes, it is necessary to position optical elements of the scene-detection systems accurately since the depth analyzation is performed based on the distance between the optical elements. However, the present positioning method, such as surface-mount technology, cannot control the distance between the optical elements accurately. Therefore, for each device having the scene-detection systems, it is required to check the error of the distance through an additional detection process, and to take the error into the consideration in the depth calculation of the device.

SUMMARY

One embodiment of the present invention provides a lens module with plural wafer level lens groups integrally formed. The wafer level lens groups are used for obtaining the image depth. The distance between the wafer level lens groups are determined in the wafer level fabrication and forming process. As a result, the error of the distance is small and negligible, and it is not necessary to check the error through an additional detection process, or to take the error into the consideration in the depth calculation of the device.

According to one embodiment of the present invention, a lens module includes a first wafer level lens group, a second wafer level lens group, a first sensor, and a second sensor. The first wafer level lens group has a first optical axis. The second wafer level lens group has a second optical axis. The first optical axis is parallel with the second optical axis, and the first wafer level lens group and the second wafer level lens group are integrally formed. The first sensor is disposed corresponding to the first wafer level lens group, and the first sensor is disposed on the first optical axis. The second sensor is disposed corresponding to the second wafer level lens group, and the second sensor is disposed on the second optical axis.

In one or more embodiments, an edge of the first wafer level lens group is seamlessly connected to an edge of the second wafer level lens group.

According to another embodiment of the present invention, a lens module includes plural wafer level lens groups and plural sensors. Each of the wafer level lens groups has an optical axis, and the optical axes are parallel. The wafer level lens groups are integrally formed. Each of the sensors is disposed on each of the optical axes.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
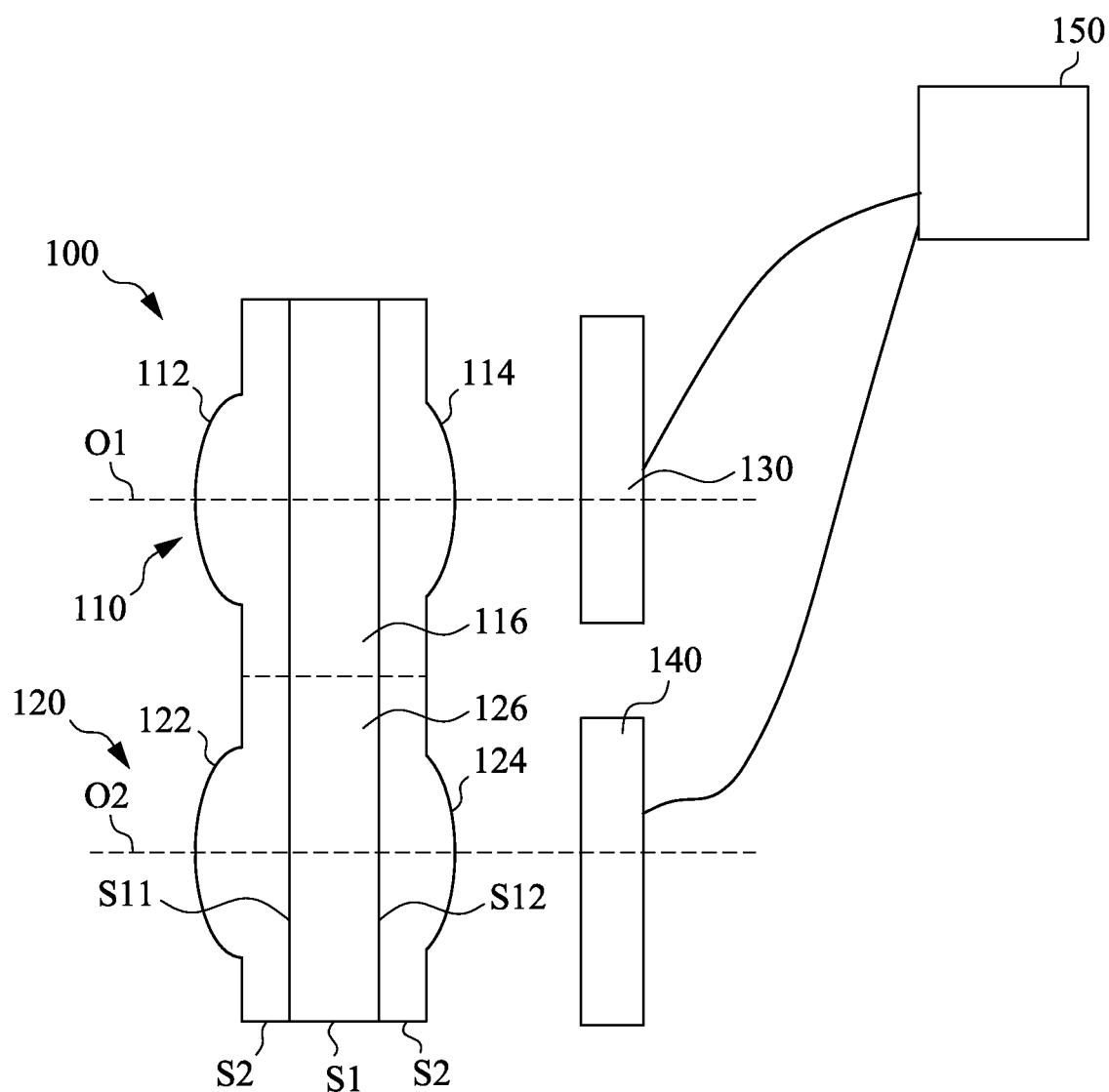
FIG. 1 is a cross-sectional view of a lens module according to an embodiment of the invention.

Reference will now be made in detail to the present embodiments of the invention, examples of which are illustrated in the accompanying drawings. Wherever possible, the same reference numbers are used in the drawings and the description to refer to the same or like parts.

FIG. 1 is a cross-sectional view of a lens module 100 according to an embodiment of the invention. The lens module 100 includes a first wafer level lens group 110, a second wafer level lens group 120, a first sensor 130, and a second sensor 140. The first wafer level lens group 110 has a first optical axis O1. The second wafer level lens group 120 has a second optical axis O2. The first optical axis O1 is parallel with the second optical axis O2, and the first wafer level lens group 110 and the second wafer level lens group 120 are integrally formed. The first sensor 130 is disposed corresponding to the first wafer level lens group 110, and the first sensor 130 is disposed on the first optical axis O1. The second sensor 140 is disposed corresponding to the second wafer level lens group 120, and the second sensor 140 is disposed on the second optical axis O2.

It is noted that the first optical axis O1 is not aligned or overlapped with the second optical axis O2. The first wafer level lens group 110 and a second wafer level lens group 120 are used to collect the light of different images. In this way, the first sensor 130 can receive a first image through the first wafer level lens group 110, and the second sensor 140 can receive a second image through the second wafer level lens group 120.

In one or more embodiments, the lens module 100 includes a processor 150 coupled to the first sensor 130 and the second sensor 140. The processor 150 analyzes the first image and the second image to obtain an image depth value by calculation.

In this embodiment, the first wafer level lens group 110 and the second wafer level lens group 120 can be formed by plural layers, such as glass substrates and resins. The first wafer level lens group 110 and the second wafer level lens group 120 can be fabricated through the same steps.

In detail, a combination of the first wafer level lens group 110 and the second wafer level lens group 120 can form a stack which includes the same substrate S1 and the same lens layers S2. The substrate S1 can includes a surface S11 and an opposite surface S12 opposite to the surface S1, and the lens layers S2 can be formed on the surface S11 and the opposite surface S12 respectively. The lens layers S2 can include two lens structures respectively. In this way, a portion of the substrate S1 and a portion of the lens layers S2 together form the first wafer level lens group 110, and another portion of the substrate S1 and another portion of the lens layers S2 together form the second wafer level lens group 120. Also, the lens structures of lens layers S2 offer a focus power in the first wafer level lens group 110 and the second wafer level lens group 120.

Herein, a dash line between the first wafer level lens group 110 and the second wafer level lens group 120 is used to indicate the first wafer level lens group 110 and the second wafer level lens group 120 can be two independent group while the first wafer level lens group 110 and the second wafer level lens group 120 remain structurally connected. It is noted that the dash line does not indicate any structural separation between the first wafer level lens group 110 and the second wafer level lens group 120.

In one or more embodiments, the first wafer level lens group 110 and the second wafer level lens group 120 are substantially the same, but it should not limit the scope of the present invention. The first wafer level lens group 110 and the second wafer level lens group 120 can be different but still integrally formed.

Traditionally, the lens groups are designed to be positioned respectively at determined positions. For example, one of the positioning methods can be surface-mount technology, in which lens groups are mounted to the determined places respectively. However, due to the limitation, the mounting process is not accurate enough, and the distance between the mounted lens groups is not a fixed and precise value, and that is, the distance varies with different lens systems. The variable distance between the mounted lens groups is a problem in the mass production devices having lens systems. It is necessary to perform a correcting process to detect an error of the distance between the mounted lens groups for each of the lens systems and to take the error into consideration in the calculation of image depth. The error can be an absolute error, which is the difference between the determined distance and the real distance.

In this embodiment, since the first wafer level lens group 110 and the second wafer level lens group 120 are fabricated together by a wafer level process, and they are together mounted to a determined place, the error of the distance between the first wafer level lens group 110 and the second wafer level lens group 120 is small enough to be negligible. Therefore, it is not necessary to detect the error of the distance for the calculation of image depth. Furthermore, the correcting process can be omitted, and the fabrication cost of the camera with the wafer level lens system 110 can be reduced due to the omission of the correcting process.

In one or more embodiments, the first wafer level lens group 110 and the second wafer level lens group 120 are both convex lenses, but it should not limit the scope of the present invention. It is noted that the first wafer level lens group 110 and the second wafer level lens group 120 can be concave lenses in some embodiments.

In one or more embodiments, an edge 116 of the first wafer level lens group 110 is seamlessly connected to an edge 126 of the second wafer level lens group 120. In detail, the first wafer level lens group 110 includes a first front aspheric surface 112 opposing to the first sensor 130 and a first back aspheric surface 114 facing the first sensor 130. The second wafer level lens group 120 includes a second front aspheric surface 122 opposing to the second sensor 140 and a second back aspheric surface 124 facing the second sensor 140. In this way, the first front aspheric surface 112 and the second front aspheric surface 122 are connected seamlessly, and the first back aspheric surface 114 and the second back aspheric surface 124 are connected seamlessly.

It is noted that, though the number of the wafer level lens groups are two as illustrated in FIG. 1, it should not limit the scope of the present invention. The number of the wafer level lens groups can be three, four, five, etc. The plural wafer level lens groups are formed integrally to have the determined distance therebetween.

Figure 2:
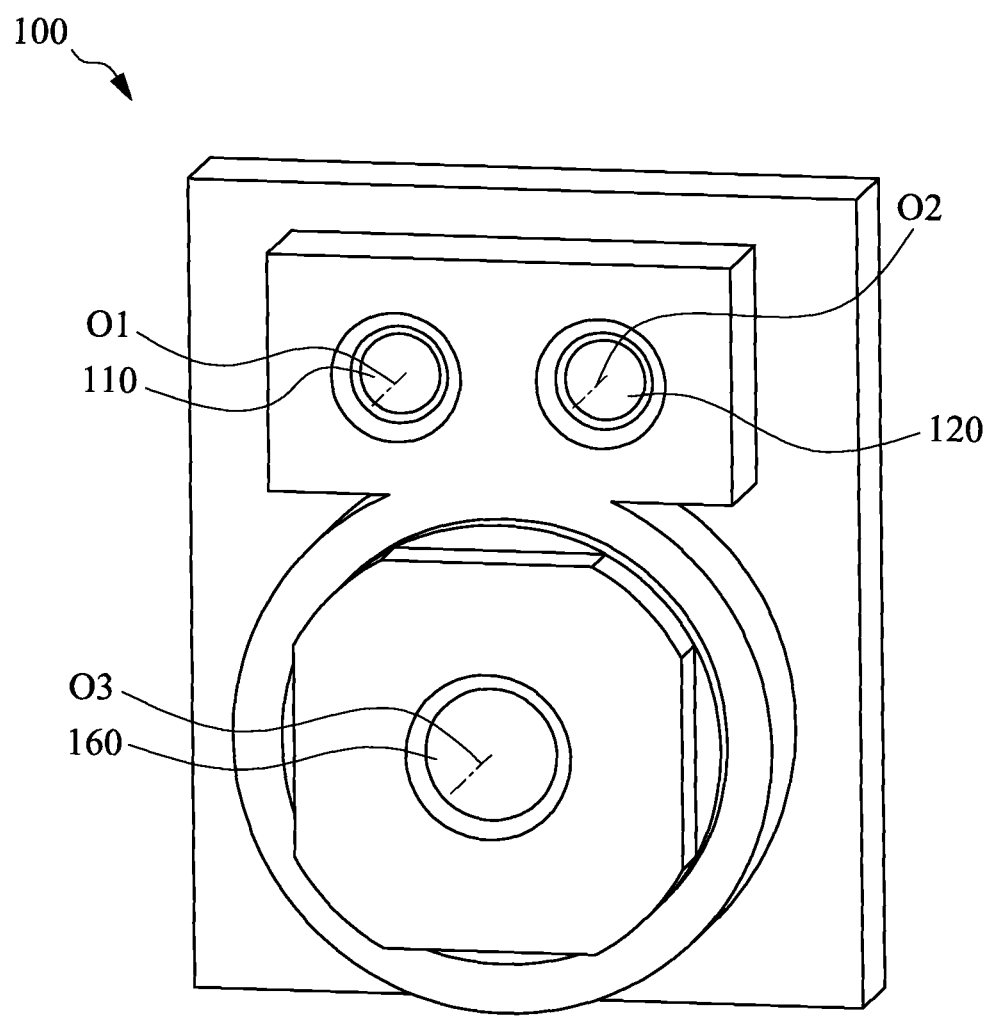
FIG. 2 is a top view of the lens module according to another embodiment of the present invention.

FIG. 2 is a top view of the lens module 100 according to another embodiment of the present invention. The lens module 100 is applicable to cameras or smart phones. In one or more embodiments, in addition to the first wafer level lens group 110 and the second wafer level lens group 120, the lens module 100 includes an image lens group 160 and an image sensor (not shown). The image lens group 160 has an image optical axis O3 parallel with the first optical axis O1 or the second optical axis O2.

Reference is made to both FIG. 1 and FIG. 2, as the first sensor 130 is disposed corresponding to the first wafer level lens group 110, the image sensor (not shown) is disposed corresponding to the image lens group 160. Also, as previous illustration, the image sensor is disposed on the image optical axis O3. The image lens group 160 and the image sensor are used to capturing an image with high resolution and quality and sending to the captured image to a controller, so that a user can view the image on a display of the cameras or smart phones.

In this way, a scene can be detected and captured by the first sensor 130, the second sensor 140, and the image sensor through the first wafer level lens group 110, the second wafer level lens group 110, and the image lens group 160 respectively. The function of the image lens group 160 is different from the function of the first wafer level lens group 110 and the second wafer level lens group 110, which are mainly used to obtain the depth value of the scene.

Therefore, the materials, optical power, and thickness of the image lens group 160 can be different from the materials, optical power, and thickness of the first wafer level lens group 110 and the second wafer level lens group 110. Also, the fabrication methods of the image lens group 160 and a combination of the first wafer level lens group 110 and the second wafer level lens group 110 can be different. Especially, the first wafer level lens group 110 and the second wafer level lens group 110 are integrally formed by a fabrication method that can produces plural wafer level lens groups at a time, but the image lens group 160 can be formed individually.

Figure 3:
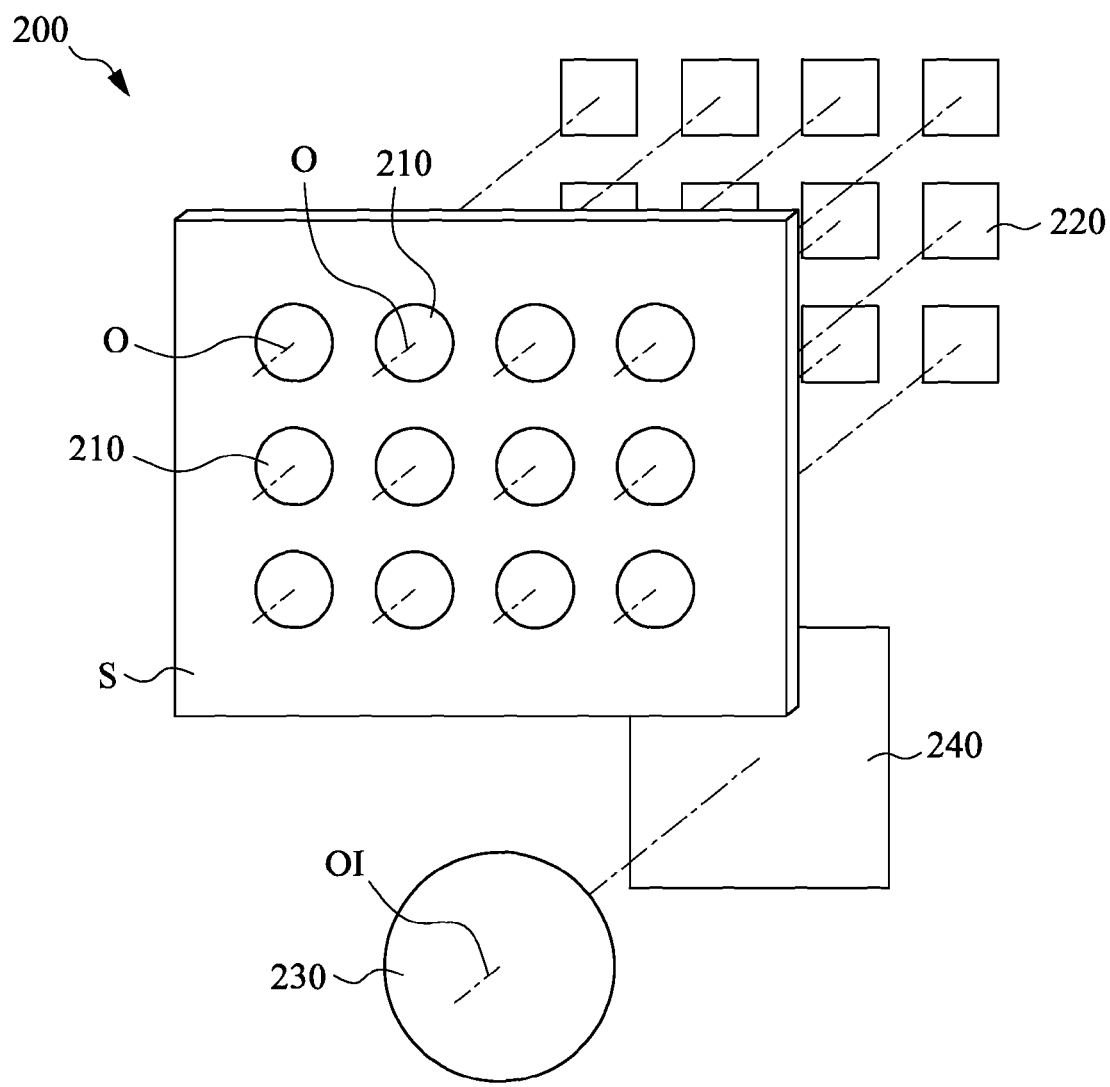
FIG. 3 is a schematically view of a lens module according to another embodiment of the invention.

FIG. 3 is a schematically view of a lens module 200 according to another embodiment of the invention. A lens module 200 includes plural wafer level lens groups 210 and plural sensors 220. Each of the wafer level lens groups 210 has an optical axis O, and the optical axes O are parallel. Each of the sensors 220 is disposed on each of the optical axes O and on the same side of the wafer level lens groups. The wafer level lens groups 210 are integrally formed. For example, the wafer level lens groups 210 can includes transparent resins or other materials, which are formed on the same substrate S as shown in the figure.

As mentioned in previous description, the lens module 200 can further include an image lens group 230 and an image sensor 240. The mage lens group 230 has an image optical axis OI parallel with the optical axes O. The image sensor 240 is disposed corresponding to the image lens group 230, and the image sensor 240 is disposed on the image optical axis OI.

Other details of the lens module 200 of this embodiment of the present invention are similar to the lens module 100 of the embodiment of FIG. 1, and therefore are not repeated herein.

In summary, embodiments of the present invention provide a lens module with plural wafer level lens groups integrally formed. The wafer level lens groups are used for obtaining the image depth. The distance between the wafer level lens groups are determined in the wafer level fabrication and forming process. As a result, the error of the distance is small and negligible, and it is not necessary to check the error through an additional detection process, or to take the error into the consideration in the depth calculation of the device.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A lens module, comprising:
   a first wafer level lens group having a first optical axis;
   a second wafer level lens group having a second optical axis, wherein the first optical axis is parallel with the second optical axis, and the first wafer level lens group and the second wafer level lens group are integrally formed;
   a first sensor disposed corresponding to the first wafer level lens group, wherein the first sensor is disposed on the first optical axis;
   a second sensor disposed corresponding to the second wafer level lens group, wherein the second sensor is disposed on the second optical axis;
   an image lens group having an image optical axis parallel with the first optical axis, wherein the image lens group has a size different from that of the first wafer level lens group and the second wafer level lens group; and
   an image sensor disposed corresponding to the image lens group, wherein the image sensor is disposed on the image optical axis.

2. The lens module of claim 1, wherein an edge of the first wafer level lens group is seamlessly connected to an edge of the second wafer level lens group.

3. The lens module of claim 1, wherein the first wafer level lens group and the second wafer level lens group are substantially the same.

4. The lens module of claim 1, wherein the first wafer level lens group and the second wafer level lens group are formed by a plurality of layers.

5. The lens module of claim 1, further comprising a processor coupled to the first sensor and the second sensor, wherein the processor calculates a depth value based on a plurality of images received by the first sensor and the second sensor and a distance between the first optical axis and the second optical axis.

6. The lens module of claim 1, wherein the first wafer level lens group comprises a first front aspheric surface opposing to the first sensor and a first back aspheric surface facing the first sensor, and the second wafer level lens group comprises a second front aspheric surface opposing to the second sensor and a second back aspheric surface facing the second sensor.

7. A lens module, comprising:
   a plurality of wafer level lens groups, wherein each of the wafer level lens groups has an optical axis, the optical axes are parallel, and the wafer level lens groups are integrally formed;
   a plurality of sensors disposed corresponding to the wafer level lens groups respectively, and each of the sensors is disposed on each of the optical axes;
   an image lens group having an image optical axis parallel with the optical axes, wherein the image lens group has a size different from that of the wafer level lens groups; and
   an image sensor disposed corresponding to the image lens group, wherein the image sensor is disposed on the image optical axis, wherein the image sensor has a size greater than that of the sensors.

* * * * *